United States Patent [19]

Huerter

[11] Patent Number: 4,541,230
[45] Date of Patent: Sep. 17, 1985

[54] DETHATCHING ATTACHMENT FOR A POWER LAWNMOWER

[76] Inventor: Ambrose F. Huerter, 3020 W. 12th St., Greeley, Colo. 80631

[21] Appl. No.: 668,480

[22] Filed: Nov. 5, 1984

[51] Int. Cl.⁴ ............................................ A01D 35/26
[52] U.S. Cl. ........................................ 56/193; 56/255
[58] Field of Search ................ 56/193, 377, 16.9, 255, 56/14.3, 364, 320.1

[56] References Cited

U.S. PATENT DOCUMENTS

| | | | |
|---|---|---|---|
| 3,385,041 | 5/1968 | Douglas | 56/255 |
| 4,183,198 | 1/1980 | Slighter | 56/377 |
| 4,306,406 | 12/1981 | Fulkerson | 56/255 |

FOREIGN PATENT DOCUMENTS

| | | | |
|---|---|---|---|
| 34359 | 8/1981 | European Pat. Off. | 56/255 |
| 738398 | 10/1955 | United Kingdom | 56/193 |

Primary Examiner—Jay N. Eskovitz
Attorney, Agent, or Firm—Zarley, McKee, Thomte, Woorhees & Sease; Zarley, McKee, Thomte, Woorhees & Sease

[57] ABSTRACT

A dethatching attachment for a power lawnmower comprising a mounting frame which is removably mounted on the forward end of the lawnmower and which is positioned forwardly thereof. Spaced-apart first and second elongated supports are secured to the mounting frame and extend forwardly therefrom in a diverging fashion. A plurality of spaced-apart dethatching wheels are rotatably and pivotally mounted on each of the first and second supports so as to dwell in a plane which is angularly disposed with respect to the normal direction of travel of the lawnmower. The wheels may be selectively moved between operative and inoperative positions.

12 Claims, 8 Drawing Figures

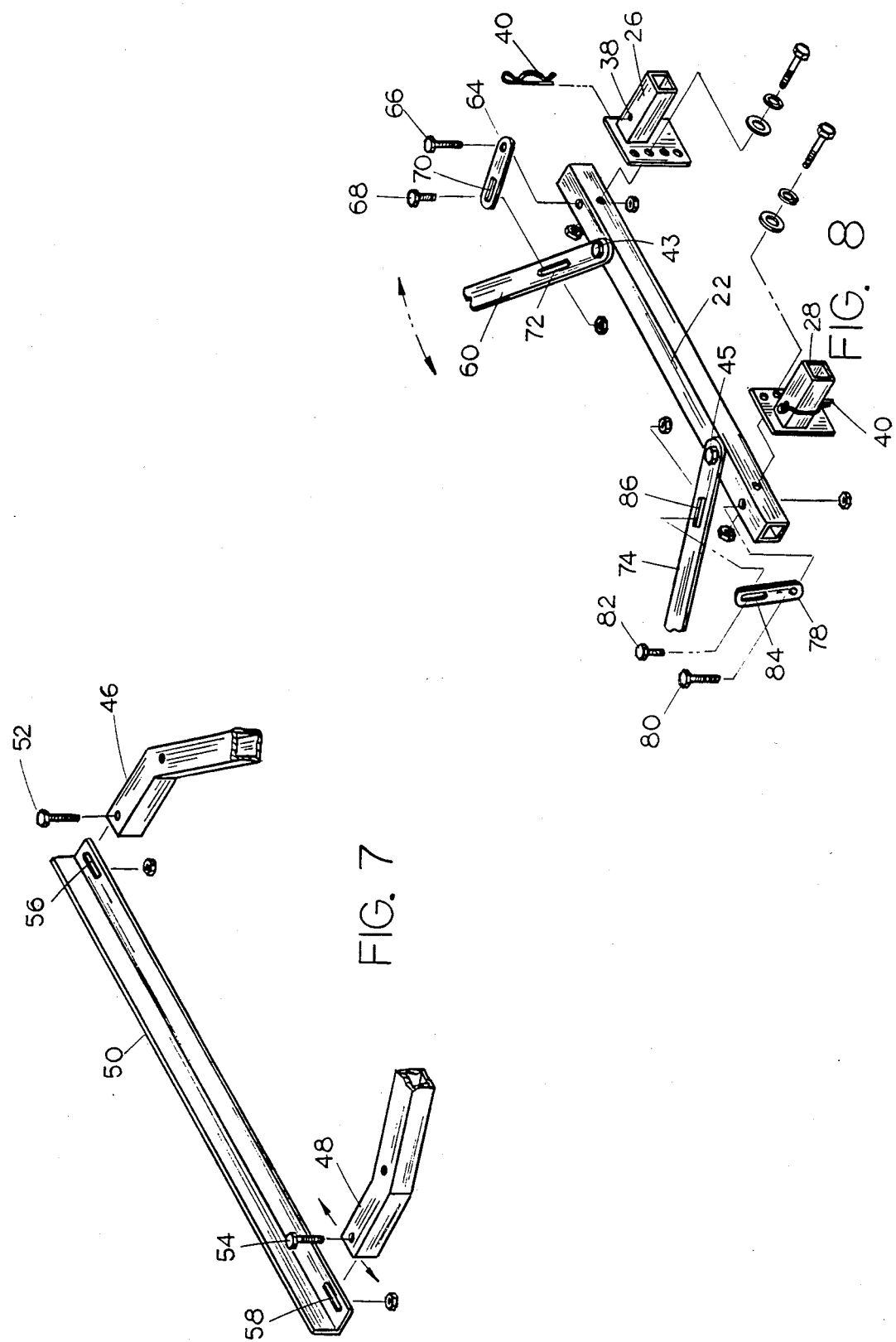

DETHATCHING ATTACHMENT FOR A POWER LAWNMOWER

BACKGROUND OF THE INVENTION

Power rakes and the like have long been used to remove thatch from lawns. The power rakes are large pieces of equipment and are very expensive. Other types of devices have been provided for removing thatch from a lawn and which are mounted on the forward end of a lawnmower. For example, one type of device comprises a plurality of spring teeth positioned forwardly of the lawnmower with the spring teeth passing through the lawn in an attempt to loosen dead grass, etc. in the lawn for collection by the lawnmower.

It is therefore a principal object of the invention to provide an improved dethatching attachment for a power lawnmower.

A further object of the invention is to provide a dethatching attachment for a power lawnmower which is quickly and easily installed on or removed from a lawnmower.

A further object of the invention is to provide a dethatching attachment for a power lawnmower including a plurality of dethatching wheels which may be moved between an operative dethatching position to an inoperative transport position.

Yet another object of the invention is to provide a dethatching attachment for a power lawnmower including means for limiting the penetration of dethatching wheels mounted thereon.

Still another object of the invention is to provide a dethatching attachment for a power lawnmower including means for selectively varying the attack angle of the dethatching wheels.

Still another object of the invention is to provide a dethatching attachment for a lawnmower which does not require extensive modification of the lawnmower.

A further object of the invention is to provide a dethatching attachment for a power lawnmower which is economical of manufacture, durable in use and refined in appearance.

These and other objects will be apparent to those skilled in the art.

BRIEF DESCRIPTION OF THE DRAWINGS

FIGS. 7 and 8 are enlarged partial top views illustrating the adjustment means for the support arms.

SUMMARY OF THE INVENTION

Figure 1:
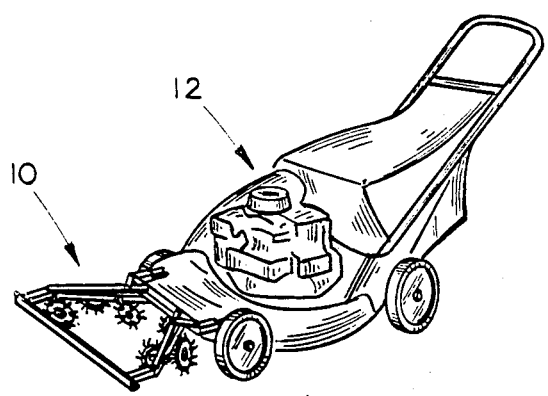
FIG. 1 is a perspective view illustrating the dethatching attachment of this invention mounted on a lawnmower.

A dethatching attachment for a power lawnmower is described and comprises a mounting frame means which is removably secured to the forward end of the lawnmower. A pair of spaced-apart elongated supports are adjustably mounted on the mounting frame means and extend forwardly therefrom in a diverging fashion. A bumper bar is secured to and extends between the forward ends of the elongated support. A plurality of dethatching wheels are pivotally and rotatably mounted on each of the first and second supports and may be moved between a lowered operative position to a raised inoperative transport position. Depth stop brackets are mounted on each of the supports in the pivotal path of the axles mounting the wheels so that the depth of the wheels is limited. When the wheels are in the operative position, forward movement of the lawnmower causes rotation of the dethatching wheels which loosens dead grass, etc. in the lawn for collection by the lawnmower.

DESCRIPTION OF THE PREFERRED EMBODIMENT

The dethatching attachment of this invention is referred to generally by the reference numeral 10 while the reference numeral 12 refers to a conventional power lawnmower including a cowling or housing 14 having a forward end 16. As seen in the drawings, lawnmower 12 includes a plurality of rotatable wheels 18.

Attachment 10 generally comprises a mounting frame means 20 including a transversely extending tubular portion 22 having rearwardly extending tubular portions 26 and 28 adjustably mounted at the opposite ends thereof. Tubular portions 26 and 28 are adapted to receive the forward ends of brackets 30 and 32 which are secured to the housing 14 by means of bolts 34. As seen in the drawings, the forward ends of the brackets 30 and 32 are provided with longitudinally spaced-apart openings 36 formed therein which are adapted to register with the openings 38 in members 26 and 28 to permit the selective and adjustable attachment of the frame means 20 to the brackets 30 and 32 by means of the pins 40.

Elongated supports 42 and 44 are secured to tubular portion 22 by means of bolts 43 and 45, respectively. The supports 42 and 44 extend forwardly and outwardly from the tubular portion 22 in a diverging fashion and have forward end portions 46 and 48 respectively. Bumper bar 50 is adjustably secured to the forward ends of end portions 46 and 48 by means of bolts 52 and 54 extending through the end portions 46 and 48 and the transversely extending slots 56 and 58 formed in the ends of the bar 50.

A stabilizer strap or brace 60 is positioned over support 42 and has its forward end secured thereto by means of bolt 62. Bolt 43 secures the rearward end of the brace 60 to tubular portion 22 as seen in the drawings. Brace 64 has its rearward end secured to tubular portion 22 by means of bolt 66 and has its forward end secured to brace 60 by means of bolt 68 extending through slot 70 in brace 64 and slot 72 in brace 60. Similarly, brace 74 has its rearward end connected to tubular portion 22 by means of bolt 45 and has its forward end secured to support 44 by means of bolt 76. The rearward end of brace 78 is secured to tubular portion 22 by means of bolt 80 and has its forward end secured to brace 74 by means of bolt 82 extending through slot 84 in brace 80 and slot 86 in brace 74.

Figure 2:
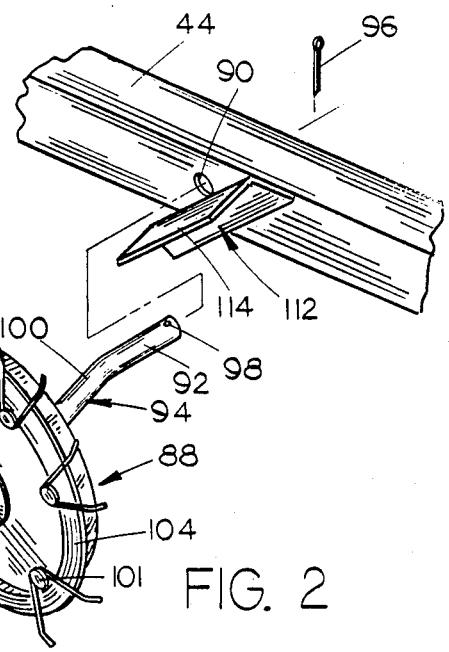
FIG. 2 is a partial perspective view illustrating the means by which the dethatching wheels are pivotally mounted on the apparatus.
Figure 3:
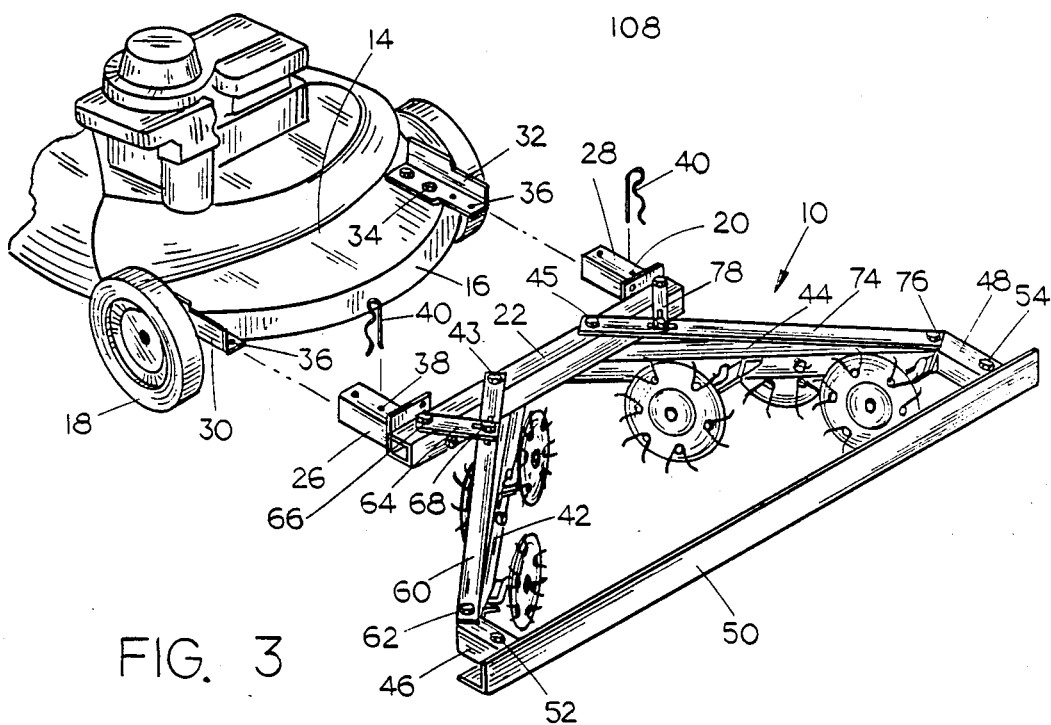
FIG. 3 is a front perspective view illustrating the means by which the attachment is mounted on the lawnmower.
Figure 5:
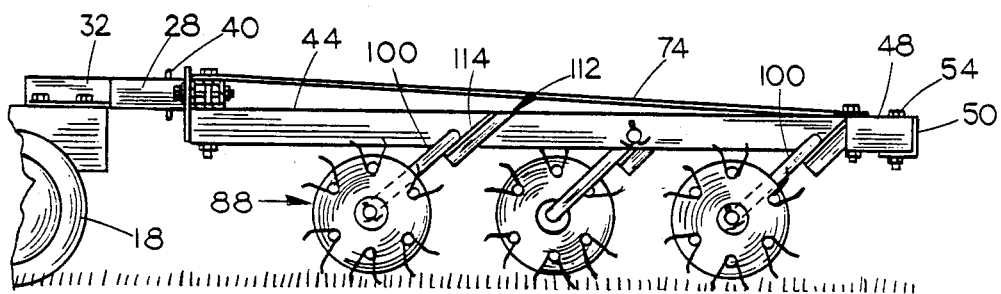
FIG. 5 is an enlarged sectional view seen on lines 5—5 of FIG. 4.
Figure 6:
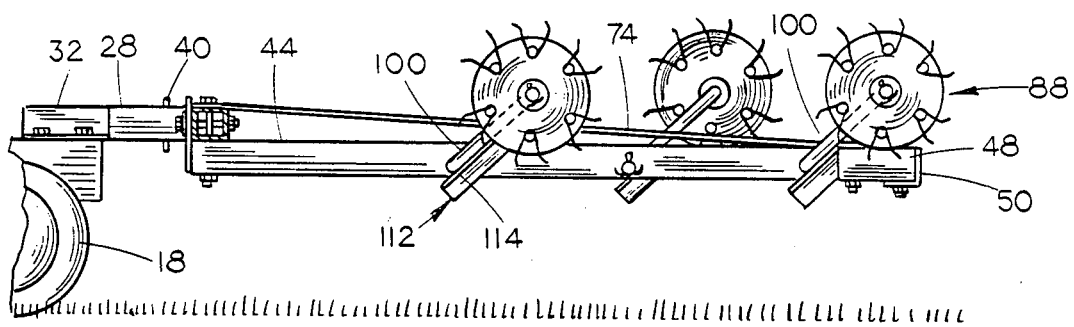
FIG. 6 is a sectional view similar to FIG. 5 except that the dethatching wheels have been pivotally moved to the carrier transport position.

A plurality of dethatching wheels 88 are mounted on the supports 42 and 44 so as to be pivotally and rotatably mounted thereon in the manner illustrated in the drawings. Inasmuch as all of the wheels 88 and the mounting means therefor are identical, only a single wheel will be described in detail. Referring to FIG. 2, it can be seen that the support 44 is provided with an opening 90 formed therein adapted to pivotally receive end portion 92 of axle 94. Cotter key 96 extends through opening 98 in end portion 92 to maintain the axle within the opening 90. Axle 94 also includes an intermediate portion 100 which extends substantially transversely from end portion 92 and which terminates in end portion 102 which is substantially parallel to end portion 92. Wheel 104 is rotatably mounted on the end portion 102 as seen in the drawings and is maintained thereon by means of a cotter key 106. A plurality of V-shaped teeth 108 are mounted on the periphery of the wheel 104 by means of bolts 110 so that the ends of the teeth extend outwardly from the periphery of the wheel. A plurality of carrier stop brackets 112 are mounted on the suports 42 and 44 beneath each of the openings 90 formed therein so that flange 114 is positioned relative to the opening 90 as seen in FIG. 2. As best illustrated in FIG. 5, the flange 114 on the bracket 12 is positioned so that intermediate portion 100 of axle 94 will engage the upper surface of the flange 114 which limits the possible downward movement of the dethatching wheel with respect to the lawnmower and the supporting structure. The depth stop feature keeps the wheels from dropping in holes in the lawn and also serves as a depth stop when the front end of the mower is raised for turning. When it is desired to move the dethatching wheels to an inoperative position, the wheel is simply grasped and pivotally moved from the position of FIG. 5 to the position of FIG. 6. As seen in FIG. 6, the intermediate portion 100 of the axle engages the upper end of the bracket 112 to maintain the dethatching wheels in an inoperative transport position. The wheels may be easily moved to the dethatching position by simply grasping the wheel and pivotally moving the wheel downwardly from the position of FIG. 6 to the position of FIG. 5.

Figure 4:
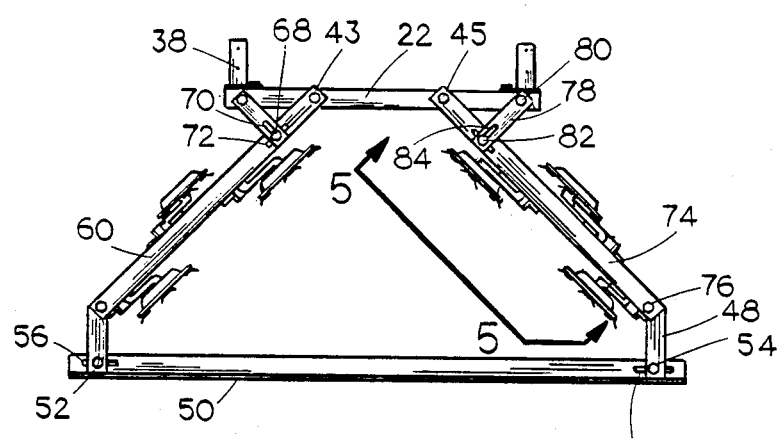
FIG. 4 is a top view of the attachment of this invention.

In the position of FIG. 5, the teeth 100 on the dethatching wheels dig into the grass to loosen dead grass, leaves, etc. therefrom so that they may be collected by the lawnmower. As best seen in FIG. 4, the plane of the wheels dwell at an angle with respect to the longitudinal movement of the lawnmower and such an angle causes the wheels to be automatically rotated as the lawnmower moves forwardly due to the engagement of the teeth with the lawn. If it desired to change the angle of attack of the teeth, the bolts maintaining the stabilizer straps 60 and 74, supports 42 and 44, straps 64 and 78, and the bumper 50 are loosened to enable the angles of the supports 42 and 44 to be changed. If the forward ends of the supports 42 and 44 are moved outwardly relative to each other, the angle of attack of the wheels will be more aggressive and vice versa. When the supports 42 and 44 are positioned in the desired position, the various bolts are then retightened. The stabilizer brace assemblies provided on the apparatus ensure that the supports 42 and 44 will be maintained in the proper attitude. The bumper bar 50 serves to prevent foreign objects such as trees, stakes, etc. from coming into contact with the dethatching wheels and damaging the same. The adjustable connection of the tubular portions 26 and 28 to the tubular portion 22 enables the apparatus to be secured to various mowers. The adjustable connection also permits the apparatus to be raised or lowered with respect to the mower.

Thus it can be seen that a novel dethatching attachment has been provided for a power lawnmower which may be quickly and easily mounted thereon and removed therefrom with a minimum of modification being necessary to the lawnmower. When it is not necessary to dethatch the lawn, the attachment may be quickly removed therefrom. With the attachment mounted on a lawnmower, the thatch in the lawn is sufficiently removed and collected by the lawnmower and does not interfere with the normal operation of the lawnmower. Thus it can be seen that the invention accomplishes at least all of its stated objectives.

I claim:

1. A dethatching attachment for a power lawnmower having a forward end, comprising,
    a mounting frame means for removable attachment to the forward end of the lawnmower and extending forwardly therefrom,
    spaced-apart first and second elongated supports secured to said mounting frame means extending forwardly therefrom in a diverging fashion,
    a plurality of spaced-apart dethatching wheels rotatably mounted on each of said first and second supports,
    said wheels being mounted on said first and second supports to as to dwell in a plane which is angularly disposed with respect to the normal direction of travel of said lawnmower,
    and means mounting said wheels on said supports for moving said wheels between operative andd inopertive position,
    said wheels being in operative engagement with the lawn when in their said operative position so that forward movement of said lawnmower will cause said wheels to rotate to remove thatch from the lawn.

2. The attachment of claim 1 wherein said mounting means comprises an axle rotatably and pivotally mounting each of said wheels.

3. The attachment of claim 1 wherein said mounting frame means is adjustable for adaptation to various models of lawnmowers.

4. The attachment of claim 1 wherein a bumper guard bar is secured to and extends between the forward ends of said first and second supports.

5. The attachment of claim 1 wherein a stabilizer brace assembly is secured to each of said supports.

6. The attachment of claim 1 wherein said supports are selectively adjustably mounted on said frame means to permit the angle of said supports to be selectively varied to change the attack angle of said wheels.

7. The attachment of claim 6 wherein an adjustable stabilizer brace assembly is secured to each of said supports.

8. The attachment of claim 1 wherein a plurality of generally V-shaped teeth are secured to each of said wheels in a spaced-apart relationship.

9. A dethatching attachment for a power lawnmower having a forward end, comprising,
    a mounting frame means for removable attachment to the forward end of the lawnmower and extending forwardly therefrom,
    spaced-apart first and second elongated supports secured to said mounting frame means extending forwardly therefrom in a diverging fashion,
    a plurality of spaced-apart dethatching wheels rotatably mounted on each of said first and second supports,
    said wheels being mounted on said first and second supports to as to dwell in a plane which is angularly disposed with respect to the normal direction of travel of said lawnmower, and means mounting said wheels on said supports for moving said wheels between operative and inoperative position, said mounting means comprising an axle rotatably and pivitally mounting each of said wheels, each of said axles comprising a first end portion which is pivotally mounted on its respective support, an intermediate portion extending substantially transversely from said first end portion, andd a second end portion extending substantially transversely from said intermediate portion, said end portions being parallel, said wheels being rotatably mounted on said second end portions.

10. The attachment of claim 9 wherein a depth stop means is provided on said supports in the pivotal path of each of said axles to limit the downward movement of the wheels relative to said supports.

11. The attachment of claim 10 wherein said depth stop means also functions as a transport carrier for maintaining said wheels in an inoperative transport position at times.

12. A dethatching attachment for a power lawnmower having a forward end, comprising, a mounting frame means for removable attachment to the forward end of the lawnmower and extending forwardly therefrom, spaced-apart first and second elongated supports secured to said mounting frame means extending forwardly therefrom in a diverging fashion, and a plurality of spaced-apart dethatching wheels rotatably mounted on each of said first and second supports, said wheels being mounted on said first and second supports so as to dwell in a plane which is angularly disposed with respect to the normal direction of travel of said lawnmower, said wheels being movable to a position wherein they are in engagement with the lawn so that forward movement of the lawnmower causes said wheels to be rotated to remove thatch from the lawn.

* * * * *